United States Patent [19]

Suter

[11] 4,256,444
[45] Mar. 17, 1981

[54] PLANT FOR INJECTION MOLDING OF THERMOSETTING EPOXY PLASTICS

[75] Inventor: Alois Suter, Im Holeeletten 29, 4054 Basel, Switzerland

[73] Assignee: Alois Suter, Basel, Switzerland

[21] Appl. No.: 944,443

[22] Filed: Sep. 21, 1978

Related U.S. Application Data

[63] Continuation-in-part of Ser. No. 722,918, Sep. 13, 1976, abandoned.

[51] Int. Cl.³ .............................................. G29G 3/00
[52] U.S. Cl. ....................................... 425/73; 264/102;
425/203; 425/208; 425/210; 425/546; 425/562;
425/574; 425/543
[58] Field of Search .................. 264/102; 425/73, 203, 425/207, 208, 210, 546, 562, 574, 543

[56] References Cited

U.S. PATENT DOCUMENTS

| | | | |
|---|---|---|---|
| 2,862,239 | 12/1958 | Pollard et al. | 264/40.3 X |
| 3,154,618 | 10/1964 | Baer et al. | 264/40.4 |
| 3,351,983 | 11/1967 | Grigull | 425/546 |
| 3,561,047 | 2/1971 | McInnis | 425/562 X |
| 3,619,447 | 11/1971 | Kerna et al. | 264/102 |
| 3,621,892 | 11/1971 | Gillespie | 264/102 X |

Primary Examiner—Jan H. Silbaugh
Attorney, Agent, or Firm—Lawrence Rosen

[57] ABSTRACT

This invention provides process and apparatus for the injection molding of epoxy resin molding compositions. The constituent materials of the epoxy resin feed mixture are separated into at least two groups in at least two separate chambers. Each of the chambers is subjected to a vacuum of from about 50 to 100 Torr in order to degassify the feed material and thereby avoid the formation of voids in the final molded product. The degassified molding materials are then fed under pressure to a mixing tube which may be heated. The mixing tube is connected by means of a valve having a discharge orifice alignable with the entry passage of a mold. The mixing tube, valve and orifice are movable toward the mold so that the orifice engages the mold and is maintained in engagement therewith at a greater pressure than the pressure exerted on the molding composition fed to the mixing tube and mold.

8 Claims, 10 Drawing Figures

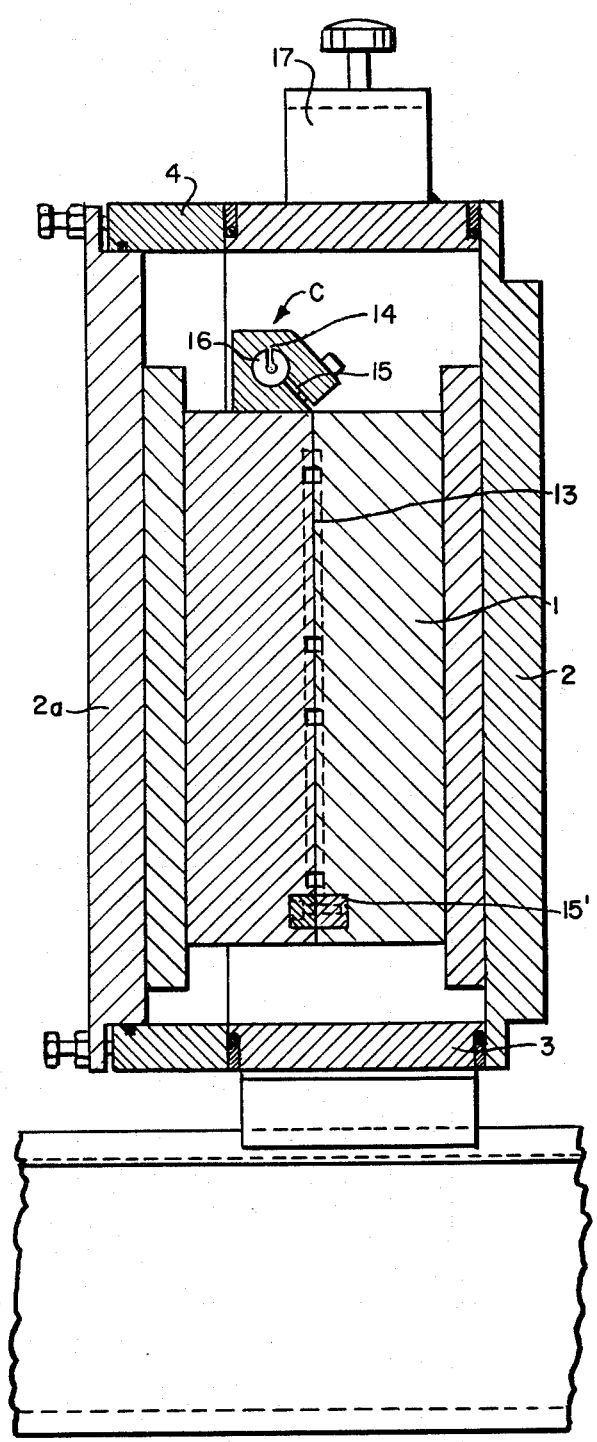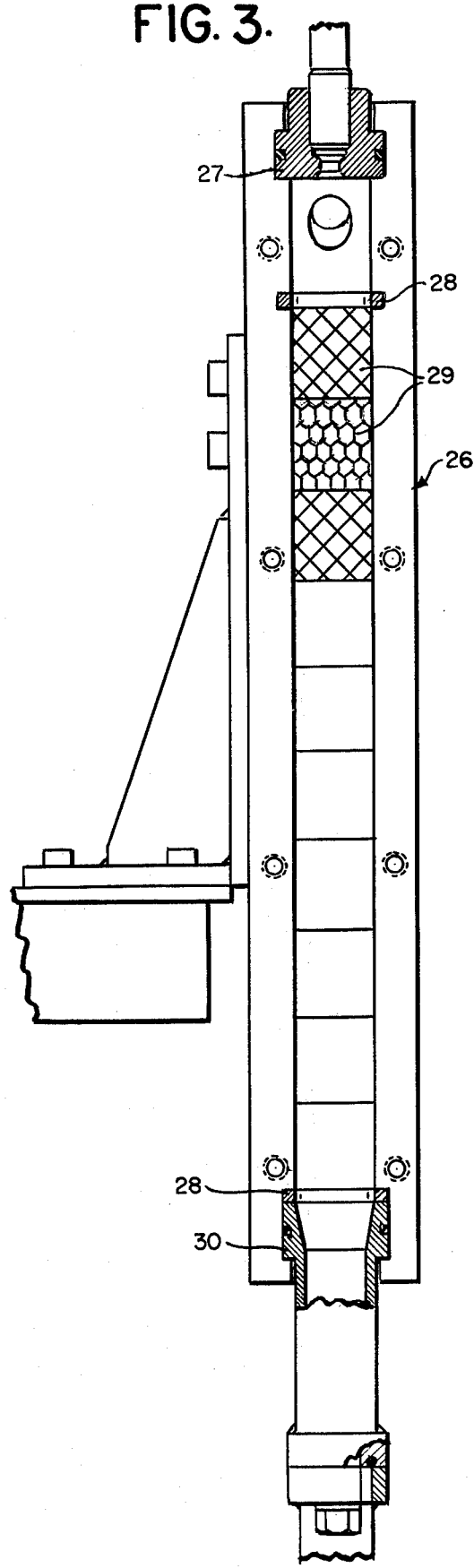

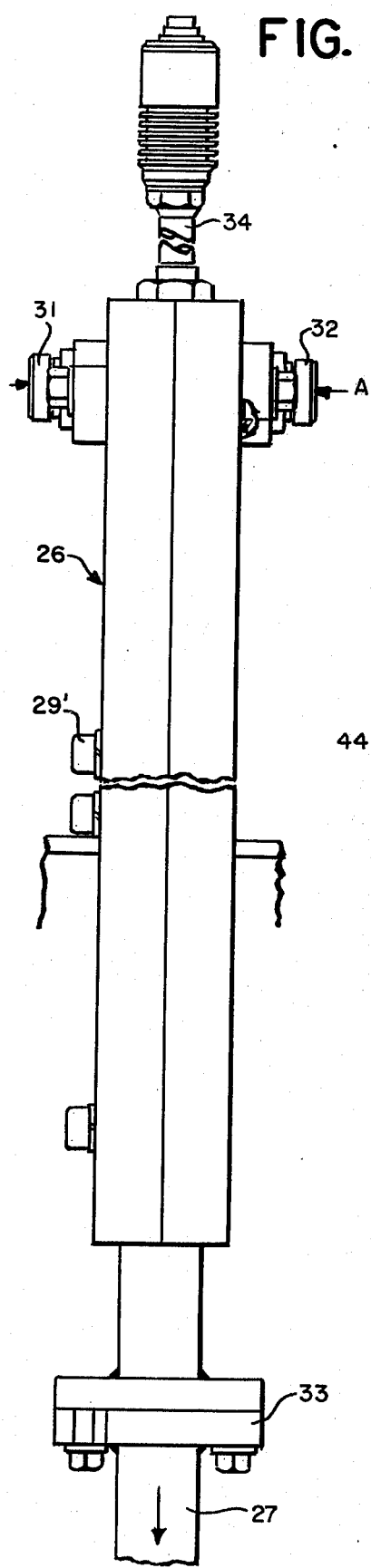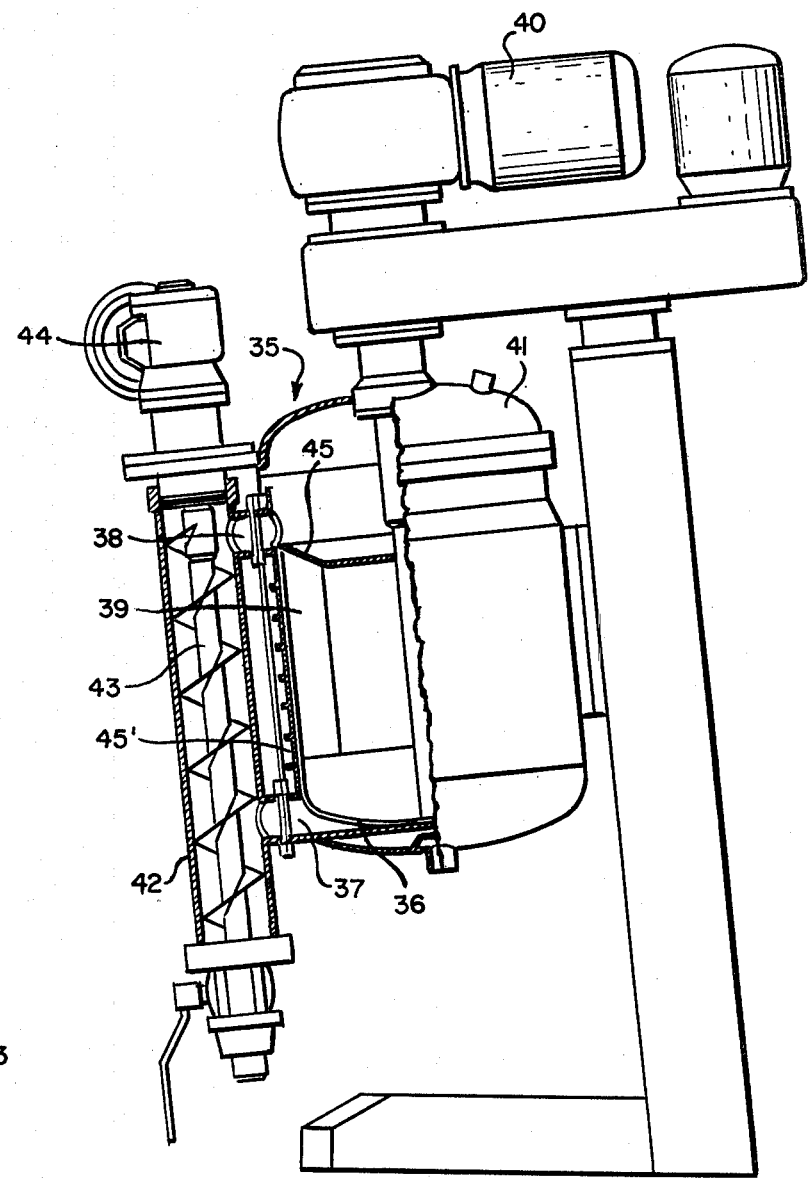

PLANT FOR INJECTION MOLDING OF THERMOSETTING EPOXY PLASTICS

This application is a continuation-in-part of Ser. No. 722,918, filed Sept. 13, 1976, now abandoned.

BACKGROUND OF THE INVENTION

The present invention relates to a process and apparatus for producing molded articles formed from thermosetting epoxy resin mixtures.

Apparatus for the processing of thermosettable epoxy resin mixtures used heretofore consisted of a heated mold, generally having two separable parts, a locking device for sealing the mold, a pressure hose and valve element, and a pressure vessel. Liquid mixtures of epoxy resins were premixed in an ordinary vacuum mixer and consisted of resin, hardener, mineral fillers, short fiberglass filaments having a length of 1 mm or above, and accelerator. The mixture was introduced at room temperature into the pressure vessel and was injected therefrom at a pressure of 2 atmospheres or above by means of the pressure hose into the mold which was generally preheated to 150° C. or above. The resultant temperature rise of more than 140° C. accelerates the reaction of the resin mixture so that curing progressed sufficiently in less than 35 minutes for the molded piece to be rigid enough to be removed from the mold.

A drawback of this process was that the compressed air which filled upper portions of the pressure vessel penetrated the upper layer of the liquid therein which, in the case of an affected surface area of 2000 sq.cm. and an average viscosity of the molding resin compound of 15,000 cP, resulted in air penetrating the liquid to a depth of approximately 20 mm. The consequent inclusion of bubbles in the molded articles obtained from this gas-saturated layer of molding compound could not be avoided. In electrical components, where the molded articles were to be employed as e.g. support insulators for high voltage applications, the ultimate electrical strength of such articles was impaired. Additionally the presence of voids in the molded articles also led to partial discharges or arcing when electrical fields were applied.

In order to achieve satisfactory crosslinking with short fiberglass filament-filled resin mixtures, the resin binders must be subjected, prior to final mixing to a heat setting with pure epoxy resin, which complicates the preparation process.

SUMMARY OF THE INVENTION

The present invention is intended to overcome the foregoing disadvantages and to provide uniform, fiberglass-reinforced, void-free, homogeneous molded products.

It is one object of the invention to provide a process for the production of molded articles from epoxy resin admixtures which avoids the formation of voids in such articles.

Another object of the invention is the provision of a process for the production of molded articles from epoxy resin admixtures which facilitate the incorporation of mineral fillers in the admixture.

Yet another object of the invention is the provision of a process for the production of movable articles from epoxy resins which improves the storability of premixtures of the molding composition.

Still another object of the invention is the provision of a process for the production of molded articles from epoxy resin which are reinforced with fiberglass and are less susceptible to contamination.

Further objects of the invention involve the provision of apparatus adopted to permit the carrying out of the process of the invention.

Other objects and advantages of the invention will become readily apparent to persons skilled in the art from the ensuring description of the invention.

BRIEF DESCRIPTION OF THE DRAWINGS

In order that the invention may be more fully comprehended it will now be described, by way of example, with reference to the accompanying drawings in which:

FIG. 2 is an end elevational view of the apparatus of FIG. 1 taken along line A—A thereof;

FIG. 3 is an elevational view of one half of a mixing pipe in a partially assembled state;

FIG. 4 is an elevational view of a mixing pipe in its assembled state formed from segments as shown in FIG. 3;

FIG. 5 is a side elevational view, partly broken away, of one form of premixer utilizable with the apparatus of this invention;

DESCRIPTION OF THE PREFERRED EMBODIMENTS

Figure 1:
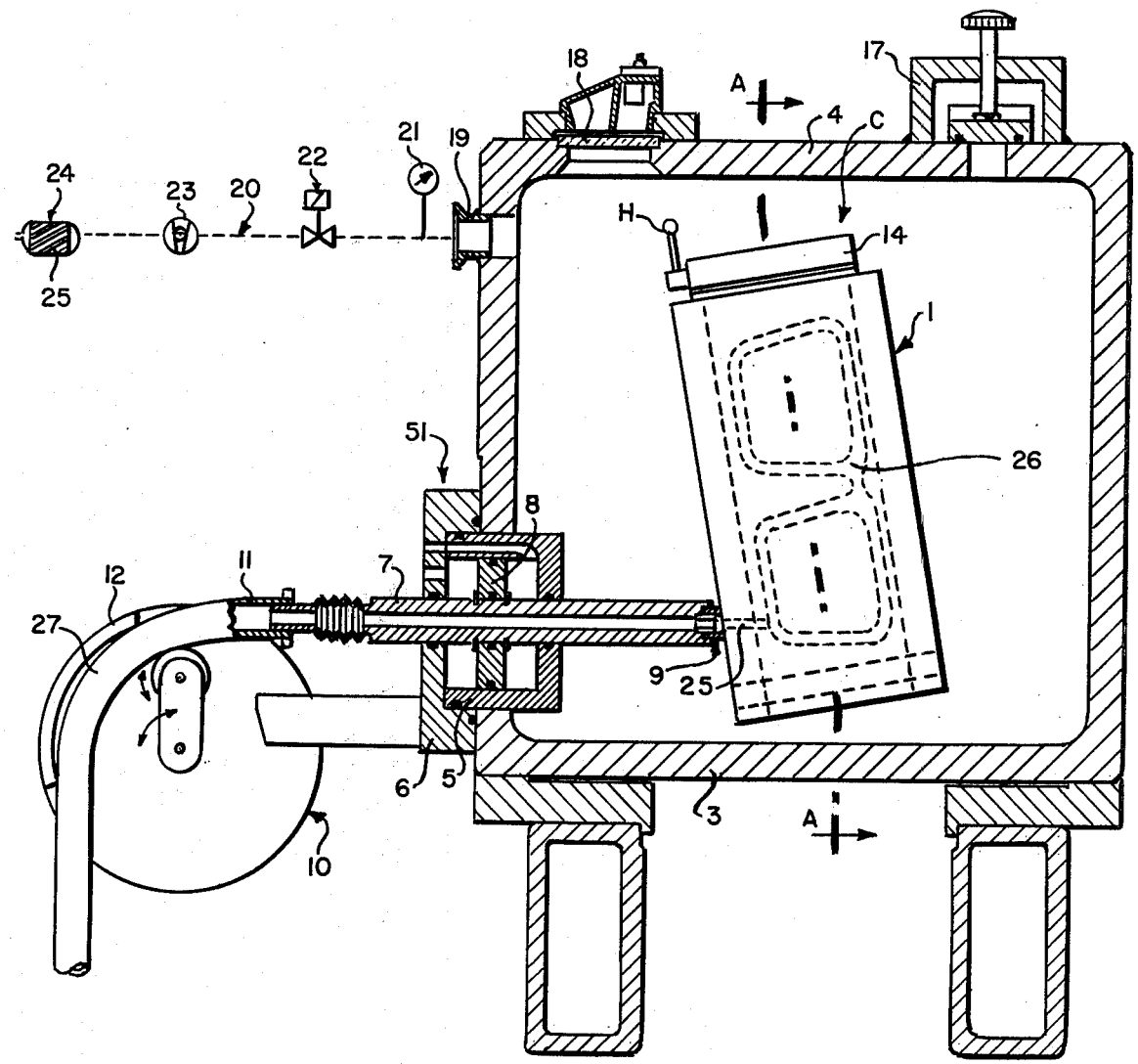
FIG. 1 is a side elevational view, partly in cross section showing apparatus embodying the features of the invention.

Before explaining the present invention in detail, it is to be understood that the invention is not limited in its application to the details of construction and arrangement of parts illustrated in the accompanying drawings since the invention is capable of other embodiments and of being practiced or carried out in various ways. Also, it is to be understood that the phraselogy and terminology employed is for the purpose of description and not of limitation.

Referring to the drawings in which like parts are similarly designated there is shown a mold 1 mounted in a frame which includes wall elements 3 and 4 and side heating plates 2 and 2a. The frame is adapted to maintain therewithin a vacuum pressure as will become clear. One wall of the frame is provided with an inlet member 5 within which, by means of flange member 6, there is slidably mounted hollow cylinder or piston rod 7 and a piston 8, such piston and hollow piston rod constituting, and being movable as, an assembly so as to permit pressured engagement of an orifice 9 at the end of piston rod 7 against the mold 1 for introduction of molding material thereinto, as will become clear.

A controllable cut-off or valve member 10 is situated in close proximity to a hose 27 which is connected at one end (not shown) with a source of molding feed material. Member 10 is designed to serve as a hose squeezer valve and includes, as a contact base for the exerting of compression onto the hose 27 an arcuate guide element 12. The external contour of the hose 27 is that of an equilateral hyperbola. The configuration of the guide element 12 makes it possible to coact with the somewhat complementary shape of the hose 27 so as to apply a gradually effective pressure thereon and thus effectuate relief of the compression chamber within the hollow cylinder 7 which is under the pressure of the resinous molding material feed thereto.

Figure 8:
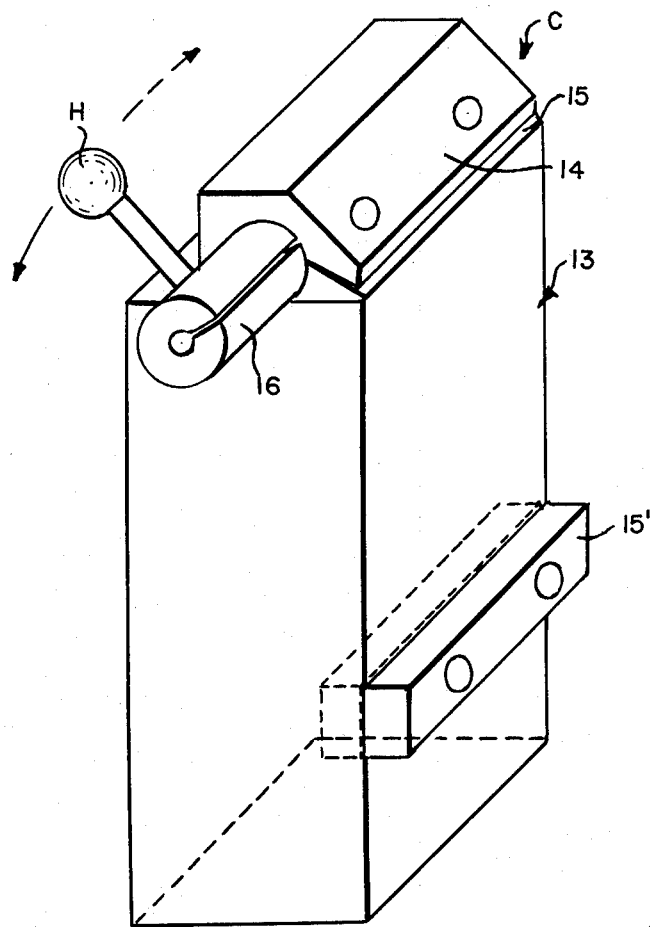
FIG. 8 is a perspective view of a mechanism for positioning of a reinforcing element within the mold.
Figure 9:
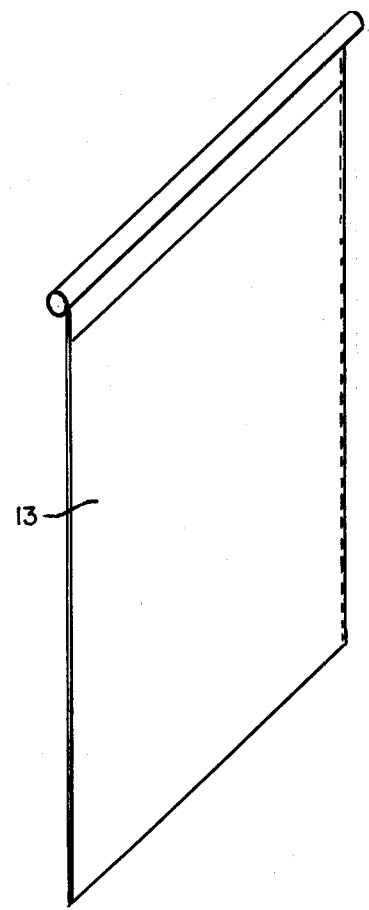
FIG. 9 illustrates a suitable fiber glass reinforcing element.

Referring particularly to FIGS. 2, 8 and 9 there is mounted on top of mold 1 a clamping device C adapted to position within the mold a reinforcing element 13 such as a fiberglass fabric (FIGS. 8, 9). The clamping device includes a block 14 having a longitudinally extending slot 15 therein dimensioned to receive one position of the reinforcing element. The block is given a longitudinal bore within which there is rotatably carried a slotted pin member 16 which is in turn provided with a handle element H. As will be appreciated, rotation of handle H will serve to concomitantly rotate pin member 16 and stretch or prestress the reinforcing element 13, which is secured at its opposed end within an insert element 15'. Insert element 15' thus assists in pre-tensioning the reinforcing element 13, enforcing the molded article.

In the upper portion of the frame there is shown a venting valve 17, a heated inspection glass 18, and a vacuum connection fitting 19. A vacuum line 20 is shown diagramatically in FIG. 1 with a pressure gauge 21, check valve 22, vacuum pump 23, and cold trap 24 cooled by means of Peltier elements 25. The trap 24 may thus be provided with series-connected glass plates which are cooled by the Peltier elements 25. Consequently, the gases supplied by the vacuum pump are cooled at the heat exchanger surface by at least 10° C. Only purified amounts of residual gas without harmful substances are capable of expansion.

FIG. 3 depicts one half of a segmented two-part mixing pipe 26 having an interchageable connecting piece, 27, support rings 28, and static mixing elements 29 inserted between the support rings. A pressure connection member 30 is shown positioned within the end of the mixing pipe remote from connecting piece 27.

FIG. 4 shows the two halves of the mixing pipe joined by screws 29', a pressure connection member 31 for a first premixed protion of a molding composition, a pressure connection member 32 for a second premixed portion of the molding composition and a connecting flange 33 for the mounting of the cut-off element 10 (FIG. 1), as well as a pressure-sensing element 34 for the control and regulation of pressure-dependent feeder pumps to be described.

In FIG. 5 there is shown one form of premixer 35 which may be employed to premix portions of the molding composition prior to introduction into the mixing pipe 26. The premixer comprises a container or mixing tank 36 having a suction pipe 37 and a discharge pipe 38. A stirrer member 39 is mounted for rotation within mixing tank 36 and is driven by electric-motor 40. The premixer includes a cover 41 which can be closed during the degassing of the feed material. In order to more efficiently degas the material, there is connected by means of flanges to suction and discharge pipes 37, 38 a circulating-feeder pipe 42 having a screw conveyor 43 rotatably mounted therein and drivable by an electric-motor 44 independently of stirrer member 39. By means of the screw conveyor 43 there is performed in addition to an intensive cross-linking of the portions of the molding composition to be premixed, also the degassing of the material to be mixed in a thin layer, e.g., as a liquid film having a thickness of from 0.2 to 0.6 mm. This thin layer is produced as the result of a vacuum formed at the break-off edges of a tapered shell 45 which is rotatable with the stirrer member 39. The duration of the degassing step for epoxy resin or hardener mixtures that are liquid at room temperature may be controlled by differences in the speeds for the drive motors 40 and 44, precisely as a function of the viscosity state of the material to be mixed. It is likewise possible to provide a heating jacket 69 for mixing tank 36 and to circulate a liquid or gaseous heat transfer medium therein in order to achieve a predetermined viscosity for the feed material.

Figure 6:
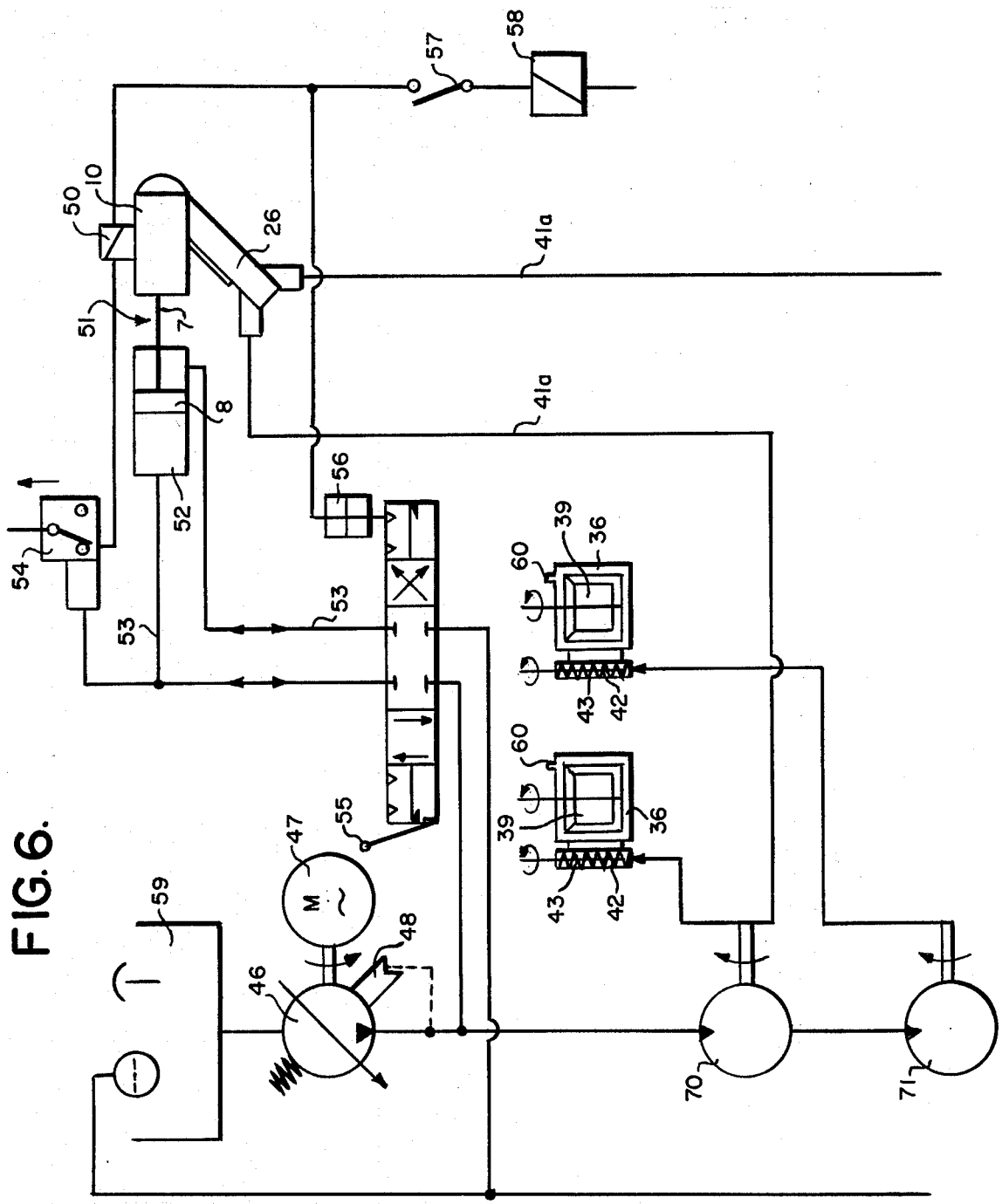
FIG. 6 is a schematic illustration of a complete molding system.

FIG. 6 illustrates a molding system having two storage tanks designed as premixing tanks 36 each of which is provided with a stirring device 39 as well as with a feeder pipe 42 equipped with an associated screw conveyor which is series-connected between the tanks 36 and mixing pipe 26. Two feeder pumps, screw conveyors 73, 74 are actuated by means of motors 70, 71 which are hydromotors. The hydromotors are supplied with a liquid pumping medium by a vane or radial piston pump 46 which is actuated in turn by an electric motor 47. A pressure regulating device 48 of conventional type is interposed in the hydraulic circuit for the purpose of maintaining the pressure in the drive network of the two hydromotors 70, 71 at a relatively constant level.

The screw of the two screw conveyors 73, 74 preferably have an adjustable clearance between the flanks of the screws as described in the copending parent application Ser. No. 723,386, now U.S. Pat. No. 4,078,653, disclosure of which is incorporated herein by reference. Their drive and throughput may be controlled, for instance by a temperature indicating controller such as the Model MIC which is manufactured by Foxbor.

Referring further to FIG. 6 it will be seen that a conduit 41a leads from each of the screw conveyors 73, 74 into a common mixing pipe 26 (FIG. 4) which is provided with static mixing elements 29 (FIG. 3) in order to mix the two premixed portions of the molding composition that are charged separately.

The mixing tube 26 is desirably enclosed within a protective tube 39 which is capable of functioning as an electric heating element in order that the mixture within the mixing tube be protected during casting against excessive shear. At the outlet end of the mixing tube 26, there is connected a feeder line (FIG. 1) such as hose 27 which is cooperable with a controllable shutoff device 10 (FIG. 1) as previously described. The controllable shutoff device 10 (FIG. 1) is provided with a turnable control element 50. FIG. 6 further shows a drive mechanism for pressure-tight connection of supplyline 27 to the mold 1, identified generally by reference numeral 51. Such drive mechanism preferably includes a hollow cylinder or piston rod 7, a cylinder 52 and a piston 8, which drive mechanism is actuated via a hydraulic line 53. The hollow cylinder or piston rod 7 (FIG. 1) is connected to piston 8 designed to be cooperable with the inlet member 5 (cylinder 52) in the mold frame as shown in FIG. 1.

The apparatus illustrated in FIG. 6 comprises furthermore a pressure switch 54, a control valve 55, a locking device 56, an auxiliary switch 57 and a timer 58. The hydraulic fluid, usually hydraulic oil, is stored in a tank 59. The tanks 36 are each provided with a connecting pipe 60 for connection to a source of vacuum (not shown) in order to reduce the pressure within such tanks to the desired level.

Figure 7:
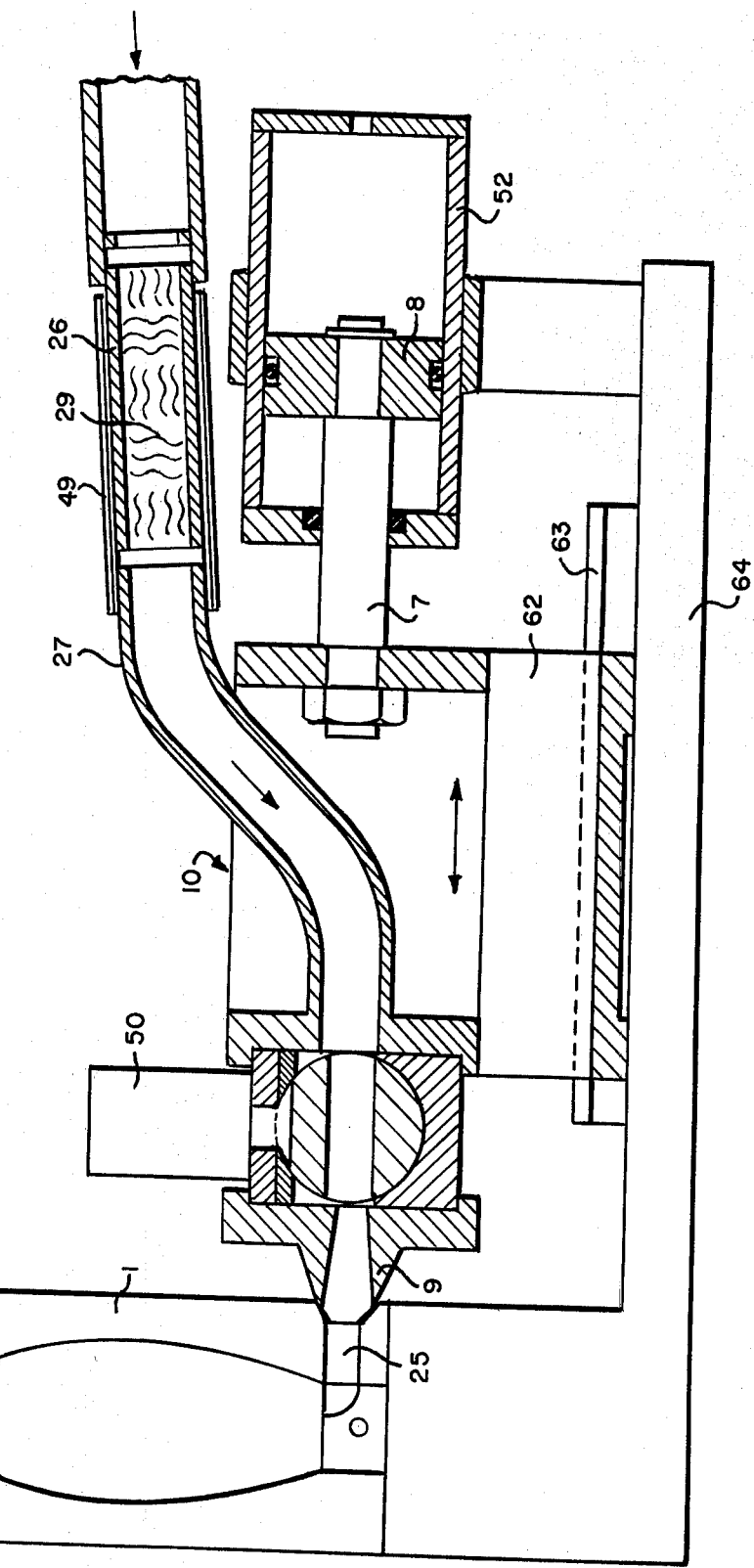
FIG. 7 is a fragmentary side elevational view, partly in cross-section of certain components of the overall molding system including the mixing tube, valve mold and movable carriage for the valve mixing tube.

FIG. 7 depicts a convenient arrangement of the cut-off valve assembly 10 relative to mixing tube 26 and mold 1. As shown piston rod 7 is connected to the cut-off valve assembly 10, the lower portion of the valve assembly being configured as or mounted fixedly upon a sliding carriage 62 which is adapted to travel along guide rail 63. The guide rail may be formed so as to constitute an integral portion of base plate 64. Thus when pump 46 supplies pressure through line 61 to the rear of piston 8 the valve assembly 10 is moved along the guide rail so as to bring orifice 9 into engagement with the mold for the injection of molding material into the mold.

The heat-settable epoxy resin selected to produce the molded articles which are desirably reinforced with glass fabric are subdivided into two portions one of which, namely a hardener, filler and resin, is introduced into one of storage tanks 36, and the other portion comprising resin, filler, and accelerator, is introduced into the other storage tank 36. The reinforcing resin binder, for instance, the glass fabric is pretensioned in the hollow mold such as by the device shown in FIG. 8.

For the filler, one can use a ground mineral talc marketed by Norwegian Talc A/S under the tradename "Microdol" which possesses an average grain diameter of 20 microns. Microdol talc is a double carbonate of calcium and magnesium. This filler is distributed in the two premixed portions introduced to tanks 36 in such a way that the two premixtures are of substantially identical viscosity at room temperature.

Through this arrangement, the mold occupancy time can be reduced drastically in that the reinforcing fiberglass fabric is extended during casting through the effect of a constant initial pretensioning force so that the glass fabric is wetted faster and more effectively by the mixture of epoxy resin. Given a maximum cycle of 15 minutes, it is thus possible to remove from the cavity a perfect, fiberglass reinforced molded article so as to dispense, in most instances, with a post cure insofar as the temperature of the hollow mold has been set at least at 140° C.

The tensioning device is associated with the hollow mold 1 and maintains the fiberglass fabric during casting uniformly under a tensile force of about 20 Newton/sq.mm. or higher in the center of the two-part mold cavity.

Subdivision of the molding composition into more than two premix portions is, of course, possible by the installing of additional storage tanks 36. Following the feeding of the two premix portions into their respective storage tanks, the tanks are closed and are subjected at room temperature to a pressure below 50, preferably 10, Torr, with the result that air which may be present between the feed material particles is removed by suction and the remaining material is practically completely degassed. Degassing can occur in stages with intermediate waiting times at the various pressure levels, or else can be carried out continuously in one single stage from ambient pressure directly to the desired vacuum. Degassing at the lowermost pressure occurs at the most for one minute.

The premix portions of the molding composition which have been degassed in this manner are delivered by means of the two pulsation-free screws 73, 74 into the heated mixing tube 26. In said mixing tube the two premix compositions are blended completely, heated, and brought into a liquid-pasty state. Subsequently, the resinous molding composition ready for casting is forced via the feeder line, e.g. the hose 27 (FIG. 1) to valve 10 which, in the operating position illustrated in FIG. 1 is forced against the hollow mold 1 for injection molding so that the molding mixture can reach, via the nozzle 9 and the feeder duct 25, the interior or cavity of the mold 1.

Continuous automatic filling of the mold 1 is guaranteed by the fact that the screw conveyors 73, 74 are actuated by the hydro-motors 70, 71. From the central hydraulic power supply comprising the vane or radial piston pump 46, additional pressure medium is fed through hydraulic line 61 connected in parallel to the rear of piston 8 whereupon, as illustrated in FIG. 1, the piston is forced into its front extreme position and in the process also carrying with it piston rod 7 and orifice 9 into the casting position. This pressure on piston 8 continues during injection molding so that the nozzle 9 is maintained under high pressure against the mold 1. This applied pressure is greater by at least 5 atm. than the resin filling pressure required to compensate for the pressure drop in the mold cavity. The pressure switch 54 which is designed to be adjustable with respect to the pressure limiting valve, controls during the casting cycle the injection pressure and the locking pressure of the hydraulic fluid for the nozzle 9. Following the attaining of a predetermined pressure, pressure switch 54 transmits a sequential signal for the opening of cut-off valve 10 by means of control element 50. The valve 10 opens and thereby permits flow of the resinous material via the nozzle 9 and the feeder duct 25 into the cavity of the mold 1. The amount of molding resin, the filling rate, the molding temperature, and the filling pressure are provided at desired levels by the piston pump 46 as a function of the cross-sectional area of the feed material flow opening in valve 10, by the reversible electrical control device with the control element 50, and a result of the circuit state of the pressure switch 54.

The pressure regulating valve 48 of the pump 46 controls the amount of the pressure medium, usually oil, as a function of the power consumption of hydromotors 70, 71 with the maximum pressure being regulated at the pressure regulator 48.

The controlled closing of valve cut-off member 10 is brought about by timer 58 and auxiliary switch 57, which are incorporated in the electrical circuit which includes pressure switch 54. Timer 58 determines also the activation of the control element 50 which closes cut-off valve 10 and, as a result, also the delivery by the hydromotors 70,71 of molding composition into the mold 1. After the closing of cut-off valve 10, the hydromotors remain stopped while the amount of pressure applied is maintained. Should the applied pressure drop below the rated value, the hydromotors and screw conveyors will resume rotation.

At a predetermined time lag, a signal is transmitted for opening the electrically locked locking device 56 and for energizing the circuit permitting the actuating of control valve 55 for retracting piston 8 (FIG. 1) by means of the oil pressure from the pump 46.

By means of the molding system described and by means of the locking-unit-actuated two-part mold 1 with a vacuum chamber, one achieves as a function of the parameters of quantity, pressure, filling rate, and temperature a controlled processing of thermosetting resin admixtures reinforced by glass fabrics and enriched, in addition, with mineral fillers, with the amount of the injection molding compound being practically constant and with the avoidance of any inclusions of air or gas.

The epoxy resins or resin systems employed in the practice of this invention may be the conventional materials well known in the art. See for example, U.S. Pat. Nos. 3,433,893 and 3,619,447. A particularly useful epoxy resin is prepared from bisphence A and diglycidyl ether, which is sold under the designation of XB 2719 by the Ciba-Geigy Corporation. The usual additives such as resin hardeners, fillers, accelerators, etc. may also be employed in conjunction with the epoxy resins.

The present invention provides, among other purposes for the efficient manufacture of molded articles which are to be subjected to high stress; for example, flywheels which, as lightweight power storage elements rotate at circumferential velocities of 120 m/sec. and more and in which, accordingly, the material is exposed to high centrifugal forces upon braking and accelerating. Another use is in connection with the manufacture of fiberglass-reinforced, glass frames.

A further use of this process is in the manufacturing of pressure tubes or torsion-stiff hollow shafts, especially drive-shafts for motor cars.

Figure 10:
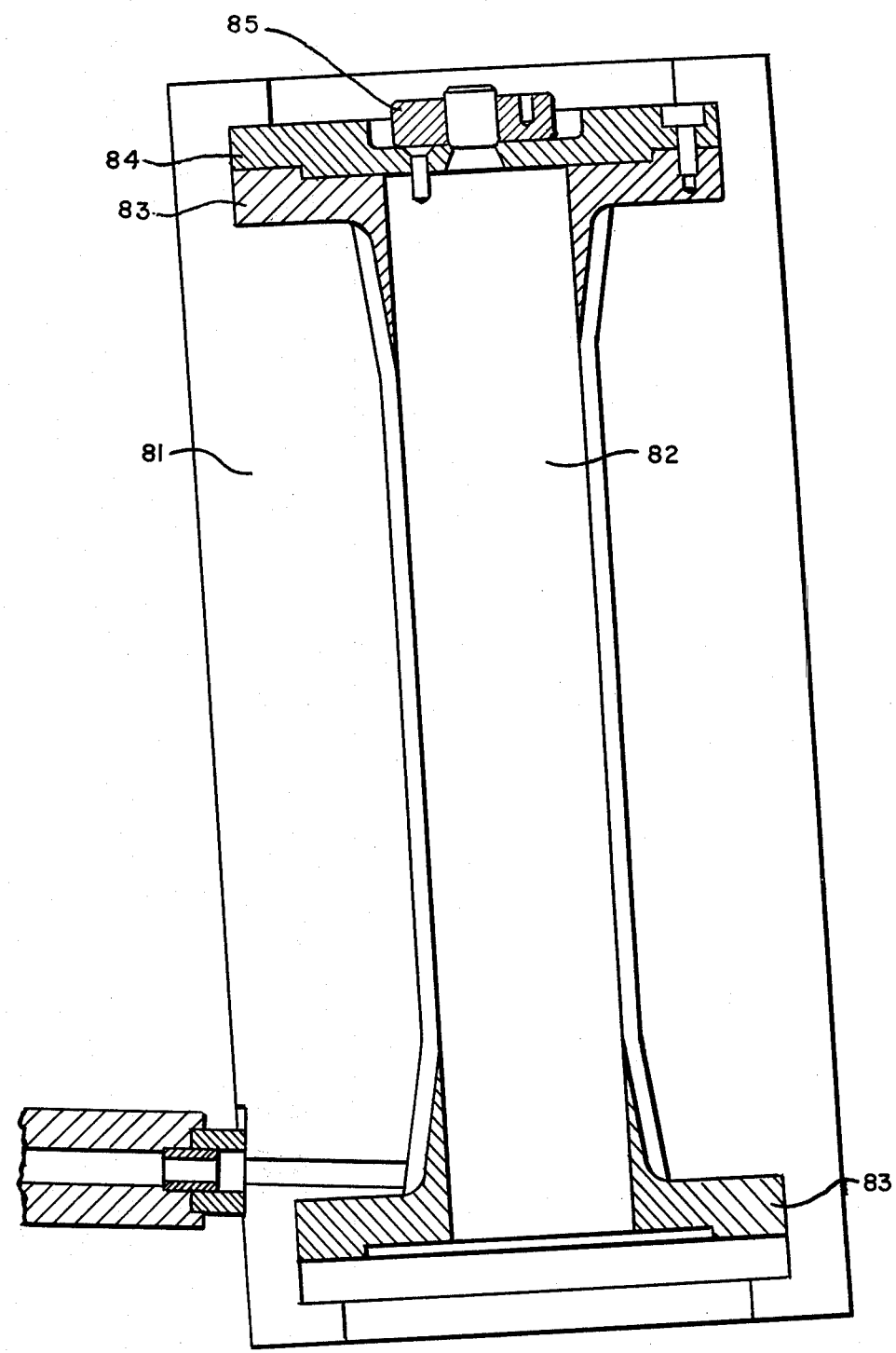
FIG. 10 is a longitudinal section through an injection mold for a drive-shaft f.e. for a motor vehicle.

FIG. 10 shows an injection mold 81 with a wound core 82 and two flange armatures 83 for the vacuum injection molding of driving shafts. A dense, compound-material without porosity for driving shafts is manufactured by winding on the core 82 on which are mounted the two flanges 83 on a lath in crosswinding a filament of 0.05 mm diameter in several layers with a pretension of 0.05% in a dense manner. According to the mechanical characteristics which are necessary the filament to be wound can be a spun graphite-, ceramic-, glass- or polymere fibre-material, such as carbonfibres. Before bringing a core 82 wound in this manner in an injection mold it has to be warmed up to 140° C. whereas the parts of the injection mold 81 in which the core 82 is embedded must have a temperature of at least 5° more i.e. at least 145° C. The injection in the closed injection mold is done under an over-pressure of 0.5 bar or more. An epoxy resin of the vinyl modified type with a hardener and an accelerator is injected. A driving shaft made according to this process with 100 parts of weight of resin on the base of BPA-Diglycidyl ether, 80 parts of weight of a hardener on the base of phthalico-acid-anhydride, 10 parts of weight of a hardener on the base of methyltetrahydrophthalico-acid-anhydride, 0.1 parts of weight accelerator on the base of benzyl dimethylamin and 400 parts of weight filament of S-glass. The time for formation was 15 minutes at 140° C.

A material examination of the after-harded driving shaft gave a filament tensioning modul of $42 \times 10^3$ MN/m2. The dense and homogenous mixture of the material was very resistant to atmospheric and chemical corrosion.

An auxiliary flange 84 and a screw 85 both fixed to the core 82 serve to keep the core 82 in place in the mold 81 and to allow to take after opening the mold 81 the core 82 out of the molded piece i.e. the driving hollow shaft.

What is claimed is:

1. Apparatus for the vacuum molding of epoxy resin molding compositions comprising:

at least two premixing tanks each having inlet means for the admission of selected constituents of the molding composition and means for mixing said constituents therein;

means for producing vacuum pressure conditions in each of said tanks;

a mixing tube for blending the degassed compositions from said tanks to form a liquid-pasty molding composition;

means associated with said mixing tube for heating the material being mixed therein;

conduit means connecting each of said tanks with said mixing tube;

means for conveying under pressure through said conduit means the degassed constituent compositions from said tanks to and through said mixing tube;

a mold having inlet means for the admission of molding composition thereinto;

means for selectively producing and maintaining vacuum pressure in said mold;

a valve member having a discharge orifice alignable with the inlet means of said mold, said valve member and orifice being selectively movable relative to said mold;

means for conveying molding composition from said mixing tube to said valve member;

and means for selectively driving said valve member and said orifice into engagement with said mold and for maintaining engagement of said orifice and mold inlet means at a pressure greater than the pressure at which said molding composition is conveyed through said mixing tube.

2. Apparatus according to claim 1, wherein said mold is mounted within a hermetically sealable housing.

3. Apparatus according to claim 2, including a venting valve mounted in said housing for rapid venting of the mold.

4. Apparatus for the vacuum molding of epoxy resin molding compositions comprising:

at least two premixing tanks each having inlet means for the admission of selected constituents of the molding composition and means for mixing said constituents therein;

means for producing vacuum pressure conditions in each of said tanks;

a mixing tube for blending the degassed compositions from said tanks to form a liquid-pasty molding composition;

static mixing elements mounted within said mixing tube;

conduit means connecting each of said tanks with said mixing tube;

means for conveying under pressure through said conduit means the degassed constituent compositions from said tanks to and through said mixing tube;

a mold having inlet means for the admission of molding composition thereinto;

means for selectively producing and maintaining vacuum pressure in said mold;

a valve member having a discharge orifice alignable with the inlet means of said mold, said valve member and orifice being selectively movable relative to said mold;

means for conveying molding composition from said mixing tube to said valve member;

and means for selectively driving said valve member and said orifice into engagement with said mold and for maintaining engagement of said orifice and mold inlet means at a pressure greater than the pressure at which said molding composition is conveyed through said mixing tube.

5. Apparatus according to claim 1 or claim 4, including a source of hydraulic pressure, said means for conveying the degassed constituent compositions under pressure being drivable by said hydraulic pressure, further means being provided drivable by said hydraulic pressure for moving said valve member and orifice into engagement with said mold and the inlet means thereof.

6. Apparatus according to claim 5, wherein said valve member, orifice and mixing tube are carried on a movable carriage, a cylinder is provided in selective communication with said source of hydraulic pressure, a piston is slidably mounted in said cylinder and is connected to said carriage, movement of said piston in a first direction under the influence of hydraulic pressure within said cylinder serving to bring the orifice of said valve member into engagement with the inlet means of said mold for the injection of resinous molding composition thereinto and movement of the piston in a second and opposite direction serving to disengage the orifice from said mold inlet means.

7. Apparatus according to claim 5, including a screw conveyor associated with each of the said premixing tanks for conveying under pressure the discharged constituent composition from the respective tanks to said common mixing tube, hydraulic motor means being provided for driving said screw conveyors, said hydraulic motor means being drivable by said source of hydraulic pressure, said valve member orifice and mixing tube being movable relative to said mold under the influence of hydraulic pressure generated by said source of hydraulic pressure.

8. Apparatus for the vacuum molding of epoxy resin molding compositions comprising:
at least two premixing tanks each having inlet means for the admission of selected constituents of the molding composition and means for mixing said constituents therein;
means for producing vacuum pressure conditions in each of said tanks;
a mixing tube for blending the degassed compositions from said tanks to form a liquid-pastry molding composition;
conduit means connecting each of said tanks with said mixing tube;
means for conveying under pressure through said conduit means the degassed constituent compositions from said tanks to and through said mixing tube;
a mold having inlet means for the admission of molding composition thereinto;
means for selectively producing and maintaining vacuum pressure in said mold;
a valve member having a discharge orifice alignable with the inlet means of said mold, said valve member and orifice being selectively movable relative to said mold;
means for conveying molding composition from said mixing tube to said valve member;
and means for selectively driving said valve member and said orifice into engagement with said mold and for maintaining engagement of said orifice and mold inlet means at a pressure greater than the pressure at which said molding composition is conveyed through said mixing tube;
said mold being mounted within a hermetically sealable housing, an inlet member being provided in a wall of said housing, a hollow piston rod and a piston carried thereby being slidably positioned in said inlet member, said orifice being provided at an end of said piston rod located within said housing, a flange member being mounted on said housing wall and defining with said inlet member a chamber within which said piston is reciprocable, and means being provided for introducing hydraulic fluid selectively to the opposed sides of said piston within said chamber to alternately move said orifice into engagement with the inlet means of the mold or away from said mold out of engagement therewith.

* * * * *

UNITED STATES PATENT AND TRADEMARK OFFICE
CERTIFICATE OF CORRECTION

PATENT NO. : 4,256,444

DATED : March 17, 1981

INVENTOR(S) : Alois Suter

It is certified that error appears in the above—identified patent and that said Letters Patent is hereby corrected as shown below:

On the first page, under Item [63] entitled "Related U.S. Application Data" insert the following line:

[30] Foreign Application Priority Data
  Sept. 16, 1975 [CH]   Switzerland..................12024/75

Signed and Sealed this

Fifth Day of October 1982

[SEAL]

Attest:

Attesting Officer

GERALD J. MOSSINGHOFF

Commissioner of Patents and Trademarks